(12) United States Patent
Isitman et al.

(10) Patent No.: US 12,319,092 B2
(45) Date of Patent: Jun. 3, 2025

(54) PLASTICIZER SYSTEM AND RUBBER COMPOSITION FOR PNEUMATIC TIRE

(71) Applicant: The Goodyear Tire & Rubber Company, Akron, OH (US)

(72) Inventors: Nihat Ali Isitman, Hudson, OH (US); Matthew Adam Goldberg, Munroe Falls, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 156 days.

(21) Appl. No.: 17/324,476

(22) Filed: May 19, 2021

(65) Prior Publication Data

US 2022/0371365 A1    Nov. 24, 2022

(51) Int. Cl.
| | |
|---|---|
| *B60C 1/00* | (2006.01) |
| *C08K 5/00* | (2006.01) |
| *C08L 9/06* | (2006.01) |
| *C08L 25/08* | (2006.01) |
| *C08L 91/00* | (2006.01) |
| *C08L 99/00* | (2006.01) |

(52) U.S. Cl.
CPC .......... *B60C 1/0016* (2013.01); *C08K 5/0016* (2013.01); *C08L 9/06* (2013.01); *C08L 25/08* (2013.01); *C08L 91/00* (2013.01); *C08L 99/00* (2013.01); *C08L 2205/02* (2013.01); *C08L 2205/035* (2013.01)

(58) Field of Classification Search
CPC . C08L 9/06; C08L 25/08; C08L 91/00; C08K 5/0016
See application file for complete search history.

(56) References Cited

U.S. PATENT DOCUMENTS

| | | | |
|---|---|---|---|
| 7,335,692 B2 | 2/2008 | Vasseur et al. | |
| 7,342,070 B2 | 3/2008 | Tsukimawashi et al. | |
| 9,771,469 B2 | 9/2017 | Sandstrom et al. | |
| 10,544,288 B2 | 1/2020 | Isitman et al. | |
| 2010/0204358 A1 | 8/2010 | Lopitaux | |
| 2017/0058112 A1 | 3/2017 | Kerns et al. | |
| 2017/0114212 A1 | 4/2017 | Pompei et al. | |
| 2017/0166732 A1 | 6/2017 | Isitman et al. | |
| 2018/0148567 A1* | 5/2018 | Papakonstantopoulos | ................ C08L 9/06 |
| 2018/0163028 A1 | 6/2018 | Brace | |
| 2018/0163029 A1 | 6/2018 | Brace | |
| 2019/0061425 A1 | 2/2019 | Broemmel et al. | |
| 2019/0062529 A1 | 2/2019 | Isitman et al. | |
| 2019/0062537 A1 | 2/2019 | Mejia et al. | |
| 2020/0283602 A1 | 9/2020 | Isitman et al. | |
| 2021/0032443 A1 | 2/2021 | Steiner et al. | |

FOREIGN PATENT DOCUMENTS

| | | |
|---|---|---|
| EP | 3450206 A1 | 3/2019 |
| WO | 2007047943 A2 | 4/2007 |
| WO | WO-2013039499 A1 * 3/2013 ........... B60C 1/0016 |

OTHER PUBLICATIONS

European Search Report for Serial No. EP22172006 dated Sep. 26, 2022.

* cited by examiner

Primary Examiner — John M Cooney
Assistant Examiner — Jeffrey S Lenihan
(74) Attorney, Agent, or Firm — Mandy B. Willis

(57) ABSTRACT

The invention relates to a plasticizer system for use in a tread rubber composition. The plasticizer system is partially derived from or devoid of petroleum-based oils and resins. The pneumatic tire has a tread of a rubber composition comprising, based on 100 parts by weight of elastomer (phr): from about 10 to about 60 phr of a solution polymerized styrene-butadiene rubber (SSBR) extended with an oil not derived from petroleum; and a plasticizer system comprised of (1) from about 4 to about 8 phr of a plasticizing oil not derived from petroleum, and (2) from about 10 to about 20 phr of a hydrocarbon plasticizing resin selected from styrene/α-methyl styrene resin and polyterpene plasticizing resin.

8 Claims, No Drawings

PLASTICIZER SYSTEM AND RUBBER COMPOSITION FOR PNEUMATIC TIRE

FIELD OF THE INVENTION

The present exemplary embodiments relate to a plasticizer system for use with a rubber composition either partially derived from or devoid of petroleum-based oils and resins. It finds particular application in conjunction with tire treads and will be described with particular reference thereto. However, it is appreciated that the present exemplary embodiments are also amenable to other like applications.

BACKGROUND OF THE INVENTION

In an ongoing effort to improve sustainability in the tire industry, certain rubber compositions were developed in which soybean oil replaces the petroleum-based rubber processing oil (comprised of at least one of naphthenic and paraffinic oils). However, the incorporation of more sustainable compositions in tire treads has revealed some compromise to certain tread properties. For example, while soybean oil improves sustainability (with an unexpected improvement in low temperature winter performance too), the benefits are to the detriment wet braking performance. There is a desire to develop tread rubber compositions from sustainable, renewable non-petroleum derived sources from which there is little to no compromise in tread performance.

To achieve a balance of tread rubber performances from tread rubber compositions containing a non-petroleum derived rubber processing oil, it is recognized that adjustments to rubber compositions are needed.

To meet the challenge of providing a tread rubber composition from sustainable, renewable non-petroleum derived sources, it is desired to evaluate a plasticizer system that:

(A) partially or fully replaces a petroleum-based rubber plasticizing oil (e.g., comprised of at least one of naphthenic and paraffinic oils) with a vegetable triglyceride oil such as, for example, soybean oil, (B) includes a hydrocarbon plasticizing resin selected from a petroleum-derived hydrocarbon and a non-petroleum derived hydrocarbon, such as polyterpene, wherein the hydrocarbon plasticizing resin is added to the rubber composition to improve, or at least maintain the balance between, tire performance characteristics, such as, low temperature winter performance and wet braking, and (C) forms a rubber composition with solution polymerized styrene-butadiene rubber (SSBR) pre-extended with an oil not derived from petroleum.

While plasticizer systems containing a combination of oil and resin are used in various rubber compositions, including rubber compositions for tire components, inclusion of the disclosed plasticizer system with a solution polymerized styrene-butadiene rubber (SSBR) pre-extended with an oil not derived from petroleum is considered to be a significant departure from conventional practice.

Invention and Practice of the Invention

In accordance with one aspect of the invention, a pneumatic tire is provided having a tread of a rubber composition comprising, based on 100 parts by weight of elastomer (phr):

(A) conjugated diene-based elastomer(s) comprised of:
 (1) from about 10 to about 60 phr of a solution polymerized styrene-butadiene rubber (SSBR) extended with an oil not derived from petroleum, (2) from about 20 to about 100 phr of at least one additional conjugated diene-based elastomer comprised of at least one of polybutadiene, cis 1,4-polyisoprene rubber, and styrene/butadiene elastomer; and (B) a plasticizer system comprised of:
 (1) from about 2 to about 20 phr of a plasticizing oil not derived from petroleum, and
 (2) from about 5 to about 20 phr of a hydrocarbon plasticizing resin selected from a petroleum-derived hydrocarbon and a non-petroleum derived hydrocarbon, such as polyterpene.

In accordance with another aspect of the invention, a plasticizer system is provided for use with solution polymerized styrene-butadiene rubber (SSBR) pre-extended with an oil not derived from petroleum. The system comprises, based on 100 parts by weight of elastomer (phr):

(A) from about 2 to about 20 phr of a plasticizing oil not derived from petroleum; and
(B) from about 5 to about 20 phr of a hydrocarbon plasticizing resin selected from a petroleum-derived hydrocarbon and a non-petroleum derived hydrocarbon, such as polyterpene.

By desiring the rubber composition to contain fewer to no materials derived from petroleum, it is meant that the plasticizer system and/or the rubber composition will contain minimal, if any, petroleum-based processing oil. For example, it is desired that the rubber composition be limited to from zero to about 10 phr of petroleum-based processing oil.

In one embodiment, the plasticizer system includes at least one plasticizing oil and at least one plasticizing resin. In one embodiment, the plasticizing oil may comprise up to about 20 phr of rubber processing oil. In another embodiment, the plasticizing oil may comprise no less than about 2 phr of rubber processing oil. In practice, the plasticizing oil may comprise from about 2 to about 20 phr of rubber processing oil and, more preferably, from about 4 to about 8 phr of rubber processing oil. Processing oil may be included in the rubber composition as extending oil typically used to extend elastomers. Processing oil may also be included in the rubber composition by addition of the oil directly during rubber compounding. The processing oil used in the rubber composition may include both extending oil present in the elastomers and process oil added during compounding. Suitable process oils include various oils as are known in the art, including aromatic, paraffinic, naphthenic, vegetable triglyceride oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 Parts, 2003, $62^{nd}$ edition, published by the Institute of Petroleum, United Kingdom.

A suitable vegetable triglyceride oil is comprised of a combination of saturated and unsaturated esters where the unsaturated esters are comprised of a combination of at least one of oleic acid ester, linoleate acid ester and linoleate acid ester. The saturated esters may be comprised of, for example, and not intended to be limiting, at least one of stearic acid ester and palmitic acid ester.

In one embodiment, the vegetable triglyceride oil is comprised of at least one of soybean oil, sunflower oil, rapeseed oil, and canola oil. In practice, the plasticizer system includes at least one of soybean oil and sunflower oil.

The plasticizer system further comprises at least one plasticizing resin from about 5 to about 50 phr and, more preferably, from about 10 to about 20 phr.

Representative resins include coumarone type resins, including coumarone-indene resins and mixtures of coumarone resins, naphthenic oils, phenol resins, and rosins. Other suitable resins include phenol-terpene resins such as phenol-acetylene resins, phenol-formaldehyde resins, alkyl phenol-formaldehyde resins, terpene-phenol resins, polyterpene resins, and xylene-formaldehyde resins. Further suitable resins include petroleum hydrocarbon resins such as synthetic polyterpene resins; aromatic hydrocarbon resins; resins resulting from the polymerization of styrene and alphamethyl styrene; aliphatic hydrocarbon resins; aliphatic cyclic hydrocarbon resins, such as dicyclopentadiene resins; aliphatic aromatic petroleum resins; hydrogenated hydrocarbon resins; hydrocarbon tackified resins; aliphatic alicyclic petroleum resins; rosin derivatives; and terpene resins.

In one embodiment, the plasticizing resin comprises at least a hydrocarbon resin. In one embodiment, the plasticizing resin comprises hydrocarbon resins and excludes phenol-terpene resins. In one embodiment, the plasticizing resin is selected from hydrocarbon resins synthesized by cationic polymerization of styrene and alphamethyl styrene. In one embodiment, the plasticizing resin comprises at least copolymer resins of styrene and α-methyl styrene or polyterpene resins. In one embodiment, the plasticizing resin comprises at least copolymer resins of styrene and α-methyl styrene and excludes a polyterpene resin.

In practice, the plasticizer system comprises from about 5 to about 20 phr of a hydrocarbon plasticizing resin selected from either a petroleum-derived hydrocarbon, such as styrene/α-methyl styrene resin, and a non-petroleum derived hydrocarbon, such as polyterpene.

Suitable styrene/α-methyl styrene resin is derived from styrene and alphamethylstyrene. It is considered that, in one aspect, its glass transition temperature (Tg) characteristic combined with its molecular weight (Mn) and molecular weight distribution (Mw/Mn) provides a suitable compatibility of the resin in the rubber composition, the degree of compatibility being directly related to the nature of the rubber composition.

The presence of the styrene/alphamethylstyrene resin in the rubber compound is considered herein to be beneficial because of observed viscoelastic properties of the tread rubber composition such as complex and storage modulus, loss modulus tan delta and loss compliance at different temperature/frequency/strain as hereinafter generally described.

The properties of complex and storage modulus, loss modulus, tan delta and loss compliance are understood to be generally well known to those having skill in such art. They are hereinafter generally described.

The glass transition temperature Tg of the copolymer resin is considered herein to be in a range of about 20° C. to about 100° C., alternatively about 30° C. to about 80° C., depending somewhat upon an intended use of the prepared tire and the nature of the polymer blend for the tire tread. A suitable measurement of TG for resins is DSC according to ASTM D6604 or equivalent.

The styrene/alphamethylstyrene resin is considered herein to be a relatively short chain copolymer of styrene and alphamethylstyrene with a styrene/alphamethylstyrene molar ratio in a range of about 0.40 to about 1.50. In one aspect, such a resin can be suitably prepared, for example, by cationic copolymerization of styrene and alphamethylstyrene in a hydrocarbon solvent.

Thus, the contemplated styrene/alphamethylstyrene resin can be characterized, for example, by its chemical structure, namely, its styrene and alphamethylstyrene contents and softening point and, if desired, by its glass transition temperature, molecular weight and molecular weight distribution.

In one embodiment, the amount of styrene/alphamethylestyrene resin in the rubber composition ranges from about 5 to about 30 phr and, more preferably, from about 10 to 20 phr.

Suitable styrene/alphamethylstyrene resin is available commercially as Sylvatraxx Resin 4401 from Arizona Chemical.

Suitable polyterpene resins may be comprised of, for example, polymers of at least one of limonene, alpha pinene and beta pinene and having a softening point in a range of from about 60 C to about 160 C. In one embodiment, the amount of polyterpene resin in the rubber composition ranges from about 5 to about 30 phr and, more preferably, from about 10 to about 20 phr. In one embodiment, the polyterpene resin is Sylvatraxx Resin 4150 from Arizona Chemical. In one embodiment, the polyterpene resin may be a polymer of α-pinene such as Dercolyte A 115 from DRT.

The styrene-butadiene rubber can be produced by polymerizing styrene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and/an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943. The solution polymerization prepared SBR (SSBR) typically has a bound styrene content in a range of about 5 to about 50, preferably about 9 to about 36, percent.

In one embodiment, the SSBR is pre-extended with 25 phr of non-petroleum derived oil, such as, vegetable triglyceride oil and, more preferably, comprising at least soybean oil.

In one embodiment, the additional conjugated diene-based elastomer may be, for example, and not intended to be limiting, at least one of cis 1,4-polybutadiene, cis 1,4-polyisoprene and styrene/butadiene elastomers other than, or in addition to, the solution polymerized styrene-butadiene rubber pre-extended with an extending oil not derived from petroleum.

In practice, it is desired that the additional conjugated diene-based elastomer is comprised of a combination of cis 1,4-polybutadiene and cis 1,4-polyisoprene rubber. The cis 1,4-polyisoprene rubber may be at least one of natural and synthetic cis 1,4-polybutadiene rubber. For example, the additional conjugated diene-based elastomer may be present in the rubber composition in the aforesaid amount of from about 20 to about 100 phr and, more preferably, from about 40 to about 90 phr and, most preferably from about 55 to about 85 phr. The additional conjugated diene-based elastomer may be comprised of from about from about 15 to about 55 phr and, more preferably, from about 30 to about 50 phr and, most preferably, from about 40 to about 45 phr of cis polybutadiene and from about from about 5 to about 45 phr and, more preferably, from about 10 to about 40 phr and, most preferably, from about 15 to about 35 phr of cis 1,4-polyisoprene rubber.

It is readily understood by those having skill in the art that the rubber composition of the tread rubber would be compounded by methods generally known in the rubber compounding art, such as mixing the various sulfur-vulcanizable constituent rubbers with variously commonly used additive materials such as, for example, curing aids, such as sulfur activators, retarders and accelerators, fillers, pigments, fatty acid, zinc acid, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. A typical peptizer may be, for example, dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

Other curatives may be used, including but not limited to from 0.5 to 5 phr of 1,6-bis(N,N' dibenzylthiocarbamoyldithio)-hexane available as Vulcuren from Lanxess.

The presence and relative amounts of the above additives are not considered to be an aspect of the present invention unless otherwise indicated, which is more primarily directed to a rubber composition made using a plasticizer system either partially derived from or devoid of petroleum-based oils and resins. The rubber composition may be incorporated in a variety of rubber components of a tire.

Representative of such tire component is, for example, a tire tread such including at least one of tread cap and/or tread base rubber layer tire sidewall, tire carcass component, such as, for example, a carcass cord ply coat, tire sidewall stiffening insert, an apex adjacent to or spaced apart from a tire bead, wire coat, inner liner tire chafer and/or tire bead component. The tread and/or tires can be built, shaped, molded and cured by various methods which will be readily apparent to those skilled in the art. In practice, the tire tread is intended to be ground-contacting.

A pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

After mixing, the compounded rubber can be fabricated such as, for example, by extrusion through a suitable die to form a tire tread (including tread cap and tread base). The tire tread is typically built onto a sulfur curable tire carcass and the assembly thereof cured in a suitable mold under conditions of elevated temperature and pressure by methods well-known to those having skill in the art.

If used herein, the terms "compounded rubber", "rubber compound" and "compound" refer to rubber compositions containing elastomers which have been compounded, or blended, with appropriate rubber compounding ingredients. The terms "rubber" and "elastomer" may be used interchangeably unless otherwise indicated. It is believed that such terms are well known to those having skill in the art.

The following examples are presented for the purposes of illustrating and not limiting the present invention. All parts are parts by weight (phr) unless specifically identified otherwise.

EXAMPLE

In this example, the effect of the disclosed plasticizer system on the performance of a tread compound is illustrated. Rubber compositions were mixed in a multi-step mixing procedure following the recipes in Table 1. Standard amounts of curatives were also included. Rubber compounds were then cured in the tire and tested on vehicles for wet braking performance, rolling resistance (RR), and treadwear, with the results given in Table 2.

A Control rubber composition was prepared as Sample A with an emulsion polymerized SBR with petroleum oil.

For the Experimental rubber Sample B, the emulsion polymerized SBR was replaced with solution polymerized SSBR extended with soybean oil. The conventional petroleum-based rubber processing oil of Control Sample A was also replaced with soybean oil, with all other ingredients essentially being the same.

For the Experimental rubber Sample C, the composition of Sample B was modified by inclusion of polyterpene traction resin, with all other ingredients essentially being the same.

The basic formulations are illustrated in the following Table 1, which is presented in terms of parts per 100 parts by weight of rubber (phr).

TABLE 1

|  | Samples | | |
|---|---|---|---|
|  | Control | Experimental | |
|  | A | B | C |
| Polybutadiene[1] | 45 | 45 | 40 |
| Emulsion SBR[2] | 28 | 0 | 0 |
| Natural rubber | 27 | 23 | 27 |
| Solution SBR[3] | 0 | 32 | 33 |
| Petroleum oil | 17.5 | 0 | 0 |
| Soybean oil | 0 | 6.4 | 6.6 |
| Carbon Black | 75 | 77 | 76 |
| Antioxidant(s) | 4.3 | 4.3 | 4.3 |
| Stearic Acid | 2 | 2 | 2 |
| Traction Resin A[4] | 3.5 | 15 | 0 |
| Traction Resin B[5] | 0 | 0 | 14 |
| ZnO[12] | 3.0 | 3.0 | 3.0 |
| Sulfur[13] | 1.7 | 1.7 | 1.7 |
| Accelerator | 1.1 | 1.2 | 1.2 |

[1]High cis polybutadiene, obtained as BUDENE1223 from The Goodyear Tire & Rubber Company.
[2]Emulsion polymerized SBR obtained as Plioflex 1769 from The Goodyear Tire & Rubber Company.
[3]Solution polymerized SBR with styrene content of 33%, extended with 25 phr soybean oil.
[4]Copolymer of styrene and alpha-methylstyrene, Tg = +39° C., obtained as Sylvatraxx 4401 from Arizona Chemical.
[5]Polyterpene resin, Tg = +60° C., obtained as Sylvatraxx 4150 from Arizona Chemical.

Various cured rubber properties of the Control A and Experimental Samples B-C are reported in the following Table 2 with the results for tires of treads formed from Control rubber composition A being normalized to values of 100 and results for experimental tires with treads of rubber compositions B and C being related to the normalized values.

The values of Control A tire are normalized to a value of 100 and the values for experimental Sample B and C tires are compared to the normalized values of 100 for Control A tire.

TABLE 2

|  | Samples | | |
|---|---|---|---|
|  | Control | Experimental | |
|  | A | B | C |
| Petroleum oil | 7 | 0 | 0 |
| Soybean oil | 0 | 6.4 | 6.6 |
| Traction Resin A[1] | 3.5 | 15 | 0 |
| Traction Resin B[2] | 0 | 0 | 14 |

TABLE 2-continued

|  | Samples | | |
|---|---|---|---|
|  | Control | Experimental | |
|  | A | B | C |
| Wet braking (higher is better) | 100 | 102 | 105 |
| Rolling resistance (higher is indication of beneficially lower rolling resistance) | 100 | 101 | 98 |
| Treadwear (higher is better) | 100 | 97 | 95 |

[1]Copolymer of styrene and alpha-methylstyrene, Tg = +39° C., obtained as Sylvatraxx 4401 from Arizona Chemical.
[2]Polyterpene resin, Tg = +60° C., obtained as Sylvatraxx 4150 from Arizona Chemical.

As can be seen in Table 2, the overall performance properties of the rubber compositions B (partially devoid of petroleum-based plasticizer) and C (completely devoid of petroleum-based plasticizer) compared favorably with the performance properties of the Control Sample A.

It is further seen that the wet braking performance of Samples B (partially devoid of petroleum-based plasticizer) and C (completely devoid of petroleum-based plasticizer) improved over that of Control Sample A.

From Table 2, it is further seen that pneumatic tires with treads of Sample C (completely devoid of petroleum-based plasticizer) exhibited a wet braking performance value of 105, which is significantly improved over the normalized value of 100 for treads formed from the rubber composition of Control Sample A.

It is further seen that the rolling resistance of Sample B (partially devoid of petroleum-based plasticizer) improved over that of Control Sample A and the rolling resistance of Sample C is similar to that of Control Sample A.

It is further seen that the treadwear performances of Samples B and C are similar to that of Control Sample A.

It is hereby concluded that, for tire treads formed from rubber compositions partially or completely devoid of petroleum-based plasticizer, the overall balance of rubber performances is maintained or improved when the plasticizer includes a triglyceride vegetable oil (as extender oil in the solution SBR) and at least an aromatic hydrocarbon resin. It is further concluded that, for tire treads formed from rubber compositions partially or completely devoid of petroleum-based products, wet braking is significantly improved when the plasticizer includes a triglyceride vegetable oil (as extender oil in the solution SBR) and a hydrocarbon resin selected from an aromatic hydrocarbon and a non-petroleum derived hydrocarbon, such as polyterpene.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a tread of a rubber composition comprising, based on 100 parts by weight of elastomer (phr):
    (A) conjugated diene-based elastomer comprised of:
        (1) between 30 phr and 45 phr of a solution polymerized styrene-butadiene rubber (SSBR)
        (2) from about 35 to about 50 phr of cis polybutadiene; and (3) from about 15 to about 35 phr of cis 1,4-polyisoprene rubber; and (B) a plasticizer system comprised of:
  (1) from about 4 to about 8 phr of a plasticizing oil not derived from petroleum, the plasticizing oil being an extender oil included in the SSBR, and
  (2) from about 10 to about 20 phr of a hydrocarbon plasticizing resin selected from a group consisting of styrene/α-methyl styrene resin and a polyterpene resin.

2. The tire of claim 1, wherein the resin is polyterpene plasticizing resin.

3. The tire of claim 2, wherein the resin has a Tg of from about +40° C. to about +80° C.

4. The tire of claim 1, wherein the plasticizing oil is a triglyceride vegetable oil comprised of at least one of soybean, sunflower, rapeseed, and canola oil.

5. The tire of claim 1, wherein the plasticizing oil is soybean oil.

6. The tire of claim 1, wherein the extender oil is a triglyceride vegetable oil.

7. The tire of claim 1, wherein the hydrocarbon plasticizing resin has a Tg of from about +20° C. to about +60° C.

8. The tire of claim 1, wherein the plasticizer system is devoid of petroleum-derived resin and oil.

\* \* \* \* \*